United States Patent
Lee et al.

(10) Patent No.: US 11,539,943 B2
(45) Date of Patent: *Dec. 27, 2022

(54) VIDEO ENCODING/DECODING METHOD AND APPARATUS, AND RECORDING MEDIUM IN WHICH BIT STREAM IS STORED

(71) Applicants: Electronics and Telecommunications Research Institute, Daejeon (KR); Industry—University Cooperation Foundation Korea Aerospace University, Goyang-si (KR); Hanbat National University Industry—Academic Cooperation Foundation, Daejeon (KR)

(72) Inventors: Jin Ho Lee, Daejeon (KR); Sung Chang Lim, Daejeon (KR); Jung Won Kang, Daejeon (KR); Hyun Suk Ko, Daejeon (KR); Ha Hyun Lee, Seoul (KR); Dong San Jun, Daejeon (KR); Seung Hyun Cho, Daejeon (KR); Hui Yong Kim, Daejeon (KR); Jae Gon Kim, Goyang-si (KR); Do Hyeon Park, Goyang-si (KR); Jin Soo Choi, Daejeon (KR); Hae Chul Choi, Daejeon (KR)

(73) Assignees: Electronics and Telecommunications Research Institute, Daejeon (KR); Industry-University Cooperation Foundation Korea Aerospace University, Goyang-si (KR); Hanbat National University Industry-Academic Cooperation Foundation, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/319,175

(22) Filed: May 13, 2021

(65) Prior Publication Data
US 2022/0014736 A1   Jan. 13, 2022

Related U.S. Application Data

(63) Continuation of application No. 16/342,225, filed as application No. PCT/KR2017/011768 on Oct. 24, 2017, now Pat. No. 11,039,130.

(30) Foreign Application Priority Data

Oct. 28, 2016 (KR) .................. 10-2016-0142275

(51) Int. Cl.
*H04N 19/11* (2014.01)
*H04N 19/159* (2014.01)
(Continued)

(52) U.S. Cl.
CPC ............ *H04N 19/11* (2014.11); *G06F 17/18* (2013.01); *H04N 19/105* (2014.11);
(Continued)

(58) Field of Classification Search
CPC ...... H04N 19/11; H04N 19/46; H04N 19/174; H04N 19/132; H04N 19/159;
(Continued)

(56) References Cited

U.S. PATENT DOCUMENTS

2008/0056355 A1   3/2008 Guo et al.
2014/0334551 A1* 11/2014 Kim ................. H04N 19/82
                                                  375/240.16
(Continued)

FOREIGN PATENT DOCUMENTS

KR          10-0739714 B1    7/2007
KR    10-2013-0137680 A     12/2013
(Continued)

OTHER PUBLICATIONS

International Search Report dated Jan. 24, 2018 in corresponding International Application No. PCT/KR2017/011768 (4 pages in English).

*Primary Examiner* — Tsion B Owens
(74) *Attorney, Agent, or Firm* — NSIP Law

(57) ABSTRACT

An image encoding/decoding method and apparatus are provided. An image decoding method performed by an image decoding apparatus according to the present invention may comprise deriving an intra-prediction mode of a current block, and performing intra-prediction for the current block based on the intra-prediction mode. The deriving of the
(Continued)

intra-prediction mode may comprise decoding a predetermined mode sameness indicator.

9 Claims, 8 Drawing Sheets

(51) Int. Cl.
| | | |
|---|---|---|
| *H04N 19/176* | (2014.01) | |
| *G06F 17/18* | (2006.01) | |
| *H04N 19/91* | (2014.01) | |
| *H04N 19/117* | (2014.01) | |
| *H04N 19/132* | (2014.01) | |
| *H04N 19/119* | (2014.01) | |
| *H04N 19/105* | (2014.01) | |
| *H04N 19/80* | (2014.01) | |
| *H04N 19/513* | (2014.01) | |
| *H04N 19/174* | (2014.01) | |
| *H04N 19/13* | (2014.01) | |

(52) U.S. Cl.
CPC ......... *H04N 19/117* (2014.11); *H04N 19/119* (2014.11); *H04N 19/13* (2014.11); *H04N 19/132* (2014.11); *H04N 19/159* (2014.11); *H04N 19/174* (2014.11); *H04N 19/176* (2014.11); *H04N 19/513* (2014.11); *H04N 19/80* (2014.11); *H04N 19/91* (2014.11)

(58) Field of Classification Search
CPC ...... H04N 19/157; H04N 19/91; H04N 19/13; H04N 19/593; H04N 19/119; H04N 19/513; H04N 19/117; H04N 19/80; H04N 19/176; H04N 19/105; G06F 17/18
See application file for complete search history.

(56) References Cited

U.S. PATENT DOCUMENTS

| | | | |
|---|---|---|---|
| 2016/0044310 A1* | 2/2016 | Park | H04N 19/44 |
| | | | 375/240.12 |
| 2016/0198189 A1 | 7/2016 | Lee et al. | |
| 2016/0255363 A1 | 9/2016 | Kim et al. | |
| 2017/0339404 A1* | 11/2017 | Panusopone | H04N 19/647 |

FOREIGN PATENT DOCUMENTS

| | | |
|---|---|---|
| KR | 10-2014-0098043 A | 8/2014 |
| KR | 10-2014-0098113 A | 8/2014 |
| KR | 10-1585565 B1 | 1/2016 |
| KR | 10-1600720 B1 | 3/2016 |
| KR | 10-1633746 B1 | 6/2016 |
| WO | WO 2012/171463 A1 | 12/2012 |

* cited by examiner

VIDEO ENCODING/DECODING METHOD AND APPARATUS, AND RECORDING MEDIUM IN WHICH BIT STREAM IS STORED

CROSS REFERENCE TO RELATED APPLICATIONS

This application is a Continuation Application of U.S. patent application Ser. No. 16/342,225, filed on Apr. 16, 2019, which is a U.S. National Stage Application of International Application No. PCT/KR2017/011768, filed on Oct. 24, 2017, which claims the benefit under 35 USC 119(a) and 365(b) of Korean Patent Application No. 10-2016-0142275, filed on Oct. 28, 2016, in the Korean Intellectual Property Office.

TECHNICAL FIELD

The present invention relates to a method and apparatus for encoding/decoding an image and a recording medium storing a bitstream. Particularly, the present invention relates to a method and apparatus for encoding/decoding an image efficiently signaling intra prediction mode and a recording medium storing a bitstream generated by an image encoding method/apparatus of the present invention.

BACKGROUND ART

Recently, demands for high-resolution and high-quality images such as high definition (HD) images and ultra high definition (UHD) images, have increased in various application fields. However, higher resolution and quality image data has increasing amounts of data in comparison with conventional image data. Therefore, when transmitting image data by using a medium such as conventional wired and wireless broadband networks, or when storing image data by using a conventional storage medium, costs of transmitting and storing increase. In order to solve these problems occurring with an increase in resolution and quality of image data, high-efficiency image encoding/decoding techniques are required for higher-resolution and higher-quality images.

Image compression technology includes various techniques, including: an inter-prediction technique of predicting a pixel value included in a current picture from a previous or subsequent picture of the current picture; an intra-prediction technique of predicting a pixel value included in a current picture by using pixel information in the current picture; a transform and quantization technique for compressing energy of a residual signal; an entropy encoding technique of assigning a short code to a value with a high appearance frequency and assigning a long code to a value with a low appearance frequency; etc. Image data may be effectively compressed by using such image compression technology, and may be transmitted or stored.

DISCLOSURE

Technical Problem

An object of the present invention is to provide a method and apparatus for encoding and decoding an image to enhance compression efficiency.

Another object of the present invention is to provide a method and apparatus or encoding and decoding an image efficiently signaling intra prediction mode.

Another object of the present invention is to provide a recording medium storing a bitstream generated by an image encoding method/apparatus of the present invention.

Technical Solution

An image decoding method performed by an image decoding apparatus according to the present invention may comprise deriving an intra-prediction mode of a current block, and performing intra-prediction for the current block based on the intra-prediction mode.

In the image decoding method according to the present invention, the deriving of the intra-prediction mode may comprise decoding a predetermined mode sameness indicator, and the predetermined mode sameness indicator may indicate whether or not the intra-prediction mode of the current block is identical to a predetermined mode.

In the image decoding method according to the present invention, the predetermined mode may be one of an inter-prediction mode of at least one neighbor block of the current block, a DC mode and a planar mode.

In the image decoding method according to the present invention, when the predetermined mode sameness indicator has a first value, the intra-prediction mode of the current block may be derived as the predetermined mode.

In the image decoding method according to the present invention, when the predetermined mode sameness indicator has a second value, the deriving of the intra-prediction mode may further comprise configuring an MPM list for the current block and decoding an MPM matching indicator for the MPM list, and the MPM matching indicator may indicate whether or not the intra-prediction mode of the current block is included in the MPM list.

In the image decoding method according to the present invention, when the MPM matching indicator has a first value, an MPM index for the MPM list may be decoded, and the intra-prediction mode of the current block may be derived as a candidate mode indicated by the MPM index among candidate modes included in the MPM list.

In the image decoding method according to the present invention, when the MPM matching indicator has a second value, intra-prediction mode indicating information may be decoded, and the intra-prediction mode of the current block may be derived as a mode indicated by the intra-prediction mode indicating information.

In the image decoding method according to the present invention, in the configuring of the MPM list, a plurality of MPM lists may be configured, and a number of candidate modes included in each of the plurality of MPM lists may be different.

In the image decoding method according to the present invention, when the intra-prediction mode of the current block is included in a first MPM list among the plurality of MPM lists and the first MPM list includes a single candidate mode, an MPM index for the first MPM list may not be decoded.

In the image decoding method according to the present invention, the predetermined mode sameness indicator may be decoded based on at least one among a slice type, a coding parameter, a size and a form of the current block.

An image encoding method performed by an image encoding apparatus according to the present invention may comprise determining an intra-prediction mode of a current block, performing intra-prediction for the current block based on the intra-prediction mode, and encoding the intra-prediction mode.

In the image encoding method according to the present invention, the encoding of the intra-prediction mode may comprise encoding a predetermined mode sameness indicator, and the predetermined mode sameness indicator may indicate whether or not the intra-prediction mode of the current block is identical to a predetermined mode.

In the image encoding method according to the present invention, when the intra-prediction mode of the current block is identical to the predetermined mode, the predetermined mode sameness indicator having a first value may be encoded.

In the image encoding method according to the present invention, when the intra-prediction mode of the current block is different from the predetermined mode, the predetermined mode sameness indicator having a second value may be encoded, and the encoding of the intra-prediction mode may further comprise configuring an MPM list for the current block and encoding an MPM matching indicator for the MPM list, and the MPM matching indicator may indicate whether or not the intra-prediction mode of the current block is included in the MPM list.

In the image encoding method according to the present invention, when the intra-prediction mode of the current block is included in the MPM list, the MPM matching indicator having a first value, and an MPM index for the MPM list may be encoded, and the MPM index may be an index indicating the intra-prediction mode of the current block among candidate modes included in the MPM list.

In the image encoding method according to the present invention, when the intra-prediction mode of the current block is not included in the MPM list, the MPM matching indicator having a second value and intra-prediction mode indicating information may be encoded, and the intra-prediction mode indicating information may be information indicating the intra-prediction mode of the current block.

In the image encoding method according to the present invention, in the configuring of the MPM list, a plurality of MPM lists may be configured, and a number of candidates modes included in each of the plurality of MPM lists may be different.

In the image encoding method according to the present invention, when the intra-prediction mode of the current block is included in a first MPM list of the plurality of MPM lists and the first MPM list includes a single candidate mode, an MPM index for the first MPM list may not be encoded.

In the image encoding method according to the present invention, the predetermined mode sameness indicator may be encoded based on at least one among a slice type, a coding parameter, a size and a form of the current block.

A recording medium according to the present invention may store a bitstream generated by an image encoding method according to the present invention.

Advantageous Effects

According to the present invention, a method and apparatus for encoding and decoding an image to enhance compression efficiency may be provided.

According to the present invention, a method and apparatus for encoding and decoding an image efficiently signaling intra prediction mode may be provided.

According to the present invention, a recording medium storing a bitstream generated by an image encoding method/apparatus of the present invention may be provided.

MODE FOR CARRYING OUT THE INVENTION

Figure 1:
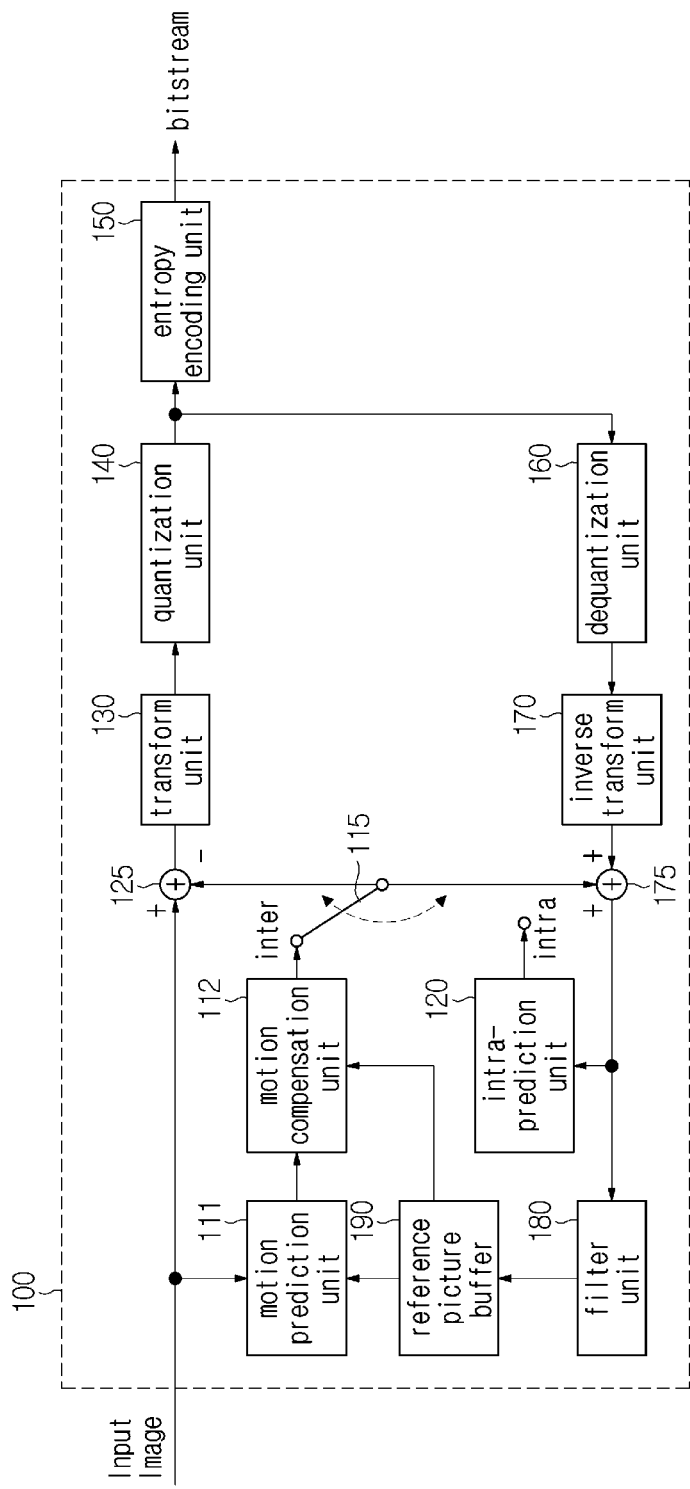
FIG. 1 is a block diagram showing configurations of an encoding apparatus according to an embodiment of the present invention.

A variety of modifications may be made to the present invention and there are various embodiments of the present invention, examples of which will now be provided with reference to drawings and described in detail. However, the present invention is not limited thereto, although the exemplary embodiments can be construed as including all modifications, equivalents, or substitutes in a technical concept and a technical scope of the present invention. The similar reference numerals refer to the same or similar functions in various aspects. In the drawings, the shapes and dimensions of elements may be exaggerated for clarity. In the following detailed description of the present invention, references are made to the accompanying drawings that show, by way of illustration, specific embodiments in which the invention may be practiced. These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to what the claims claim.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

Furthermore, constitutional parts shown in the embodiments of the present invention are independently shown so as to represent characteristic functions different from each other, Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific element is referred to as being "included", elements other than the corresponding element are not excluded, but additional elements may be included in embodiments of the present invention or the scope of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Hereinafter, embodiments of the present invention will be described in detail with reference to the accompanying drawings. In describing exemplary embodiments of the present invention, well-known functions or constructions will not be described in detail since they may unnecessarily obscure the understanding of the present invention. The same constituent elements in the drawings are denoted by the same reference numerals, and a repeated description of the same elements will be omitted.

In addition, hereinafter, an image may mean a picture configuring a video, or may mean the video itself. For example, "encoding or decoding or both of an image" may mean "encoding or decoding or both of a video", and may mean "encoding or decoding or both of one image among images of a video." Here, a picture and the image may have the same meaning.

Description of Terms

Encoder: means an apparatus performing encoding.

Decoder: means an apparatus performing decoding

Block: is an M×N array of a sample. Herein, M and N mean positive integers, and the block may mean a sample array of a two-dimensional form. The block may refer to a unit. A current block my mean an encoding target block that becomes a target when encoding, or a decoding target block that becomes a target when decoding. In addition, the current block may be at least one of an encode block, a prediction block, a residual block, and a transform block.

Sample: is a basic unit constituting a block. It may be expressed as a value from 0 to $2^{Bd}-1$ according to a bit depth ($B_d$). In the present invention, the sample may be used as a meaning of a pixel.

Unit: refers to an encoding and decoding unit. When encoding and decoding an image, the unit may be a region generated by partitioning a single image. In addition, the unit may mean a subdivided unit when a single image is partitioned into subdivided units during encoding or decoding. When encoding and decoding an image, a predetermined process for each unit may be performed. A single unit may be partitioned into sub-units that have sizes smaller than the size of the unit. Depending on functions, the unit may mean a block, a macroblock, a coding tree unit, a code tree block, a coding unit, a coding block), a prediction unit, a prediction block, a residual unit), a residual block, a transform unit, a transform block, etc. In addition, in order to distinguish a unit from a block, the unit may include a luma component block, a chroma component block associated with the luma component block, and a syntax element of each color component block. The unit may have various sizes and forms, and particularly, the form of the unit may be a two-dimensional geometrical figure such as a rectangular shape, a square shape, a trapezoid shape, a triangular shape, a pentagonal shape, etc. In addition, unit information may include at least one of a unit type indicating the coding unit, the prediction unit, the transform unit, etc., and a unit size unit depth, a sequence of encoding and decoding of a unit, etc.

Coding Tree Unit: is configured with a single coding tree block of a luma component Y, and two coding tree blocks related to chroma components Cb and Cr. In addition, it may mean that including the blocks and a syntax element of each block. Each coding tree unit may be partitioned by using at least one of a quad-tree partitioning method and a binary-tree partitioning method to configure a lower unit such as coding unit, prediction unit, transform unit, etc. It may be used as a term for designating a pixel block that becomes a process unit when encoding/decoding an image as an input image.

Coding Tree Block: may be used as a term for designating any one of a Y coding tree block, Cb coding tree block, and Cr coding tree block.

Neighbor Block: means a block adjacent to a current block. The block adjacent to the current block may mean a block that comes into contact with a boundary of the current block, or a block positioned within a predetermined distance from the current block. The neighbor block may mean a block adjacent to a vertex of the current block. Herein, the block adjacent to the vertex of the current block may mean a block vertically adjacent to a neighbor block that is horizontally adjacent to the current block, or a block horizontally adjacent to a neighbor block that is vertically adjacent to the current block.

Reconstructed Neighbor block: means a neighbor block adjacent to a current block and which has been already spatially/temporally encoded or decoded. Herein, the reconstructed neighbor block may mean a reconstructed neighbor unit. A reconstructed spatial neighbor block may be a block within a current picture and which has been already reconstructed through encoding or decoding or both. A reconstructed temporal neighbor block is a block at the same position as the current block of the current picture within a reference picture, or a neighbor block thereof.

Unit Depth: means a partitioned degree of a unit. In a tree structure, a root node may be the highest node, and a leaf node may be the lowest node. In addition, when a unit is expressed as a tree structure, a level in which a unit is present may mean a unit depth.

Bitstream: means a bitstream including encoding image information.

Parameter Set: corresponds to header information among a configuration within a bitstream. At least one of a video parameter set, a sequence parameter set, a picture parameter set, and an adaptation parameter set may be included in a parameter set. In addition, a parameter set may include a slice header, and tile header information.

Parsing: may mean determination of a value of a syntax element by performing entropy decoding, or may mean the entropy decoding itself.

Symbol: may mean at least one of a syntax element, a coding parameter, and a transform coefficient value of an encoding/decoding target unit. In addition, the symbol may mean an entropy encoding target or an entropy decoding result.

Prediction Unit: means a basic unit when performing prediction such as inter-prediction, intra-prediction, inter-compensation, intra-compensation, and motion compensation. A single prediction unit may be partitioned into a plurality of partitions with a small size, or may be partitioned into a lower prediction unit.

Prediction Unit Partition: means a form obtained by partitioning a prediction unit.

Transform Unit: means a basic unit when performing encoding/decoding such as transform, inverse-transform, quantization, dequantization, transform coefficient encoding/decoding of a residual signal. A single transform unit may be partitioned into a plurality of transform units having a small size.

FIG. 1 is a block diagram showing a configuration of an encoding apparatus according to an embodiment to which the present invention is applied.

An encoding apparatus 100 may be an encoder, a video encoding apparatus, or an image encoding apparatus. A video may include at least one image. The encoding apparatus 100 may sequentially encode at least one image.

Referring to FIG. 1, the encoding apparatus 100 may include a motion prediction unit 111, a motion compensation unit 112, an intra-prediction unit 120, a switch 115, a subtractor 125, a transform unit 130, a quantization unit 140, an entropy encoding unit 150, a dequantization unit 160, an inverse-transform unit 170, an adder 175, a filter unit 180, and a reference picture buffer 190.

The encoding apparatus 100 may perform encoding of an input image by using an intra mode or an inter mode or both. In addition, encoding apparatus 100 may generate a bitstream through encoding the input image, and output the generated bitstream. The generated bitstream may be stored in a computer readable recording medium, or may be streamed through a wired/wireless transmission medium. When an intra mode is used as a prediction mode, the switch 115 may be switched to an intra. Alternatively, when an inter de is used as a prediction mode, the switch 115 may be switched to an inter mode. Herein, the intra mode may mean an intra-prediction mode, and the inter mode may mean an inter-prediction mode. The encoding apparatus 100 may generate a prediction block for an input block of the input image. In addition, the encoding apparatus 100 may encode a residual of the input block and the prediction block after the prediction block being generated. The input image may be called as a current image that is a current encoding target. The input block may be called as a current block that is current encoding target, or as an encoding target block.

When a prediction mode is an intra mode, the intra-prediction unit 120 may use a pixel value of a block that has been already encoded/decoded and is adjacent to a current block as a reference pixel. The intra-prediction unit 120 may perform spatial prediction by using a reference pixel, or generate prediction samples of an input block by performing spatial prediction. Herein, the intra prediction may mean intra-prediction.

When a prediction mode is an inter mode, the motion prediction unit 111 may retrieve a region that best matches with an input block from a reference image when performing motion prediction, and deduce a motion vector by using the retrieved region. The reference image may be stored in the reference picture buffer 190.

The motion compensation unit 112 may generate a prediction block by performing motion compensation using a motion vector. Herein, inter-prediction may mean inter-prediction or motion compensation.

The subtractor 125 may generate a residual block by using a residual of an input block and a prediction block. The residual block may be called as a residual signal. The residual signal may mean a difference between an original signal and a prediction signal. In addition, the residual signal may be a signal generated by transforming or quantizing, or transforming and quantizing a difference between the original signal and the prediction signal. The residual block may be a residual signal of a block unit.

The transform unit 130 may generate a transform coefficient by performing transform of a residual block, and output the generated transform coefficient. Herein, the transform coefficient may be a coefficient value generated by performing transform of the residual block. When a transform skip mode is applied, the transform unit 130 may skip transform of the residual block.

A quantized level may be generated by applying quantization to the transform coefficient or to the residual signal. Hereinafter, the quantized level may be also called as a transform coefficient in embodiments.

The quantization unit 140 may generate a quantized level by quantizing the transform coefficient or the residual signal according to a parameter, and output the generated quantized level. Herein, the quantization unit 140 may quantize the transform coefficient by using a quantization matrix.

The entropy encoding unit 150 may generate a bitstream by performing entropy encoding according to a probability distribution on values calculated by the quantization unit 140 or on coding parameter values calculated when performing encoding, and output the generated bitstream. The entropy encoding unit 150 may perform entropy encoding of pixel information of an image and information for decoding an image. For example, the information for decoding the image may include a syntax element.

When entropy encoding is applied, symbols are represented so that a smaller number of bits are assigned to a symbol having a high chance of being generated and a larger number of bits are assigned to a symbol having a low chance of being generated, and thus, the size of bit stream for symbols to be encoded may be decreased. The entropy encoding unit 150 may use an encoding method for entropy encoding such as exponential Golomb, context-adaptive variable length coding (CAVLC), context-adaptive binary arithmetic coding (CABAC), etc. For example, the entropy encoding unit 150 may perform entropy encoding by using a variable length coding/code (VLC) table. In addition, the entropy encoding unit 150 may deduce a binarization method of a target symbol and a probability model of a target symbol/bin, and perform arithmetic coding by using the deduced binarization method, and a context model.

In order to encode a transform coefficient level, the entropy encoding unit 150 may change a two-dimensional block form coefficient into a one-dimensional vector form by using a transform coefficient scanning method.

A coding parameter may include information (flag, index, etc.) such as syntax element that is encoded in an encoder and signaled to a decoder, and information derived when performing encoding or decoding. The coding parameter may mean information required when encoding or decoding an image. For example, at least one value or a combination form of a unit/block size, a unit/block depth, unit/block partition information, unit/block partition structure, whether to partition of a quad-tree form, whether to partition of a binary-tree form, a partition direction of a binary-tree form (horizontal direction or vertical direction), a partition form of a binary-tree form (symmetric partition or asymmetric partition), an intra-prediction mode/direction, a reference sample filtering method, a prediction block filtering method, a prediction block filter tap, a prediction block filter coefficient, an inter-prediction mode, motion information, a motion vector, a reference picture index, a inter-prediction angle, an inter-prediction indicator, a reference picture list, a reference picture, a motion vector predictor candidate, a motion vector candidate list, whether to use a merge mode, a merge candidate, a merge candidate list, whether to use a skip mode, an interpolation filter type, an interpolation filter tab, an interpolation filter coefficient, a motion vector size, a presentation accuracy of a motion vector, a transform type, a transform size, information of whether or not a primary (first) transform is used, information of whether or not a secondary transform is used, a primary transform index, a secondary transform index, information of whether or not a residual signal is present, a coded block pattern, a coded block flag (CBF), a quantization parameter, a quantization matrix, whether to apply an intra loop filter, an intra loop filter coefficient, an intra loop filter tab, an intra loop filter shape/form, whether to apply a deblocking filter, a deblocking filter coefficient, a deblocking filter tab, a deblocking filter strength, a deblocking filter shape/form, whether to apply an adaptive sample offset, an adaptive sample offset value, an adaptive sample offset category, an adaptive sample offset type, whether to apply an adaptive in-loop filter, an adaptive in-loop filter coefficient, an adaptive in-loop filter tab, an adaptive in-loop filter shape/form, a binarization/inverse-binarization method, a context model determining method, a context model updating method, whether to perform a regular mode, whether to perform a bypass mode, a context bin, a bypass bin, a transform coefficient, a transform coefficient level, a transform coefficient level scanning method, an image displaying/outputting sequence, slice identification information, a slice type, slice partition information, tile identification information, a tile type, tile partition information, a picture type, a bit depth, and information of a lura signal or chroma signal may be included in the coding parameter.

Herein, signaling the flag or index may mean that a corresponding flag or index is entropy encoded and included in a bitstream by an encoder, and may mean that the corresponding flag or index is entropy decoded from a bitstream by a decoder.

When the encoding apparatus 100 performs encoding through inter-prediction, an encoded current image may be used as a reference image for another image that is processed afterwards. Accordingly, the encoding apparatus 100 may reconstruct or decode the encoded current image, or store the reconstructed or decoded image as a reference image.

A quantized level may be dequantized in the dequantization unit 160, or to may be inverse-transformed in the inverse-transform unit 170. A dequantized or inverse-transformed coefficient or both may be added with a prediction block by the adder 175. By adding the dequantized or inverse-transformed coefficient or both with the prediction block, a reconstructed block may be generated. Herein, the dequantized or inverse-transformed coefficient or both may mean a coefficient on which at least one of dequantization and inverse-transform is performed, and may mean a reconstructed residual block.

A reconstructed block may pass through the filter unit 180. The filter unit 180 may apply at least one of a deblocking filter, a sample adaptive offset (SAO), and an adaptive loop filter (ALF) to the reconstructed block or a reconstructed image. The filter unit 180 may be called as an in-loop filter.

The deblocking filter may remove block distortion generated in boundaries between blocks. In order to determine whether or not to apply a deblocking filter, whether or not to apply a deblocking filter to a current block may be determined based pixels included in several rows or columns which are included in the block. When a deblocking filter is applied to a block, another filter may be applied according to a required deblocking filtering strength.

In order to compensate an encoding error, a proper offset value may be added to a pixel value by using a sample adaptive offset. The sample adaptive offset may correct an offset of a deblocked image from an original image by a pixel unit. A method of partitioning pixels of an image into a predetermined number of regions, determining a region to which an offset is applied, and applying the offset to the determined region, or a method of applying an offset in consideration of edge information on each pixel may be used.

The adaptive loop filter may perform filtering based on a comparison result of the filtered reconstructed image and the original image. Pixels included in an image may be partitioned into predetermined groups, a filter to be applied to each group may be determined, and differential filtering may be performed for each group. Information of whether or not to apply the ALF may be signaled by coding units (CUs), and a form and coefficient of the ALF to be applied to each block may vary.

Figure 2:
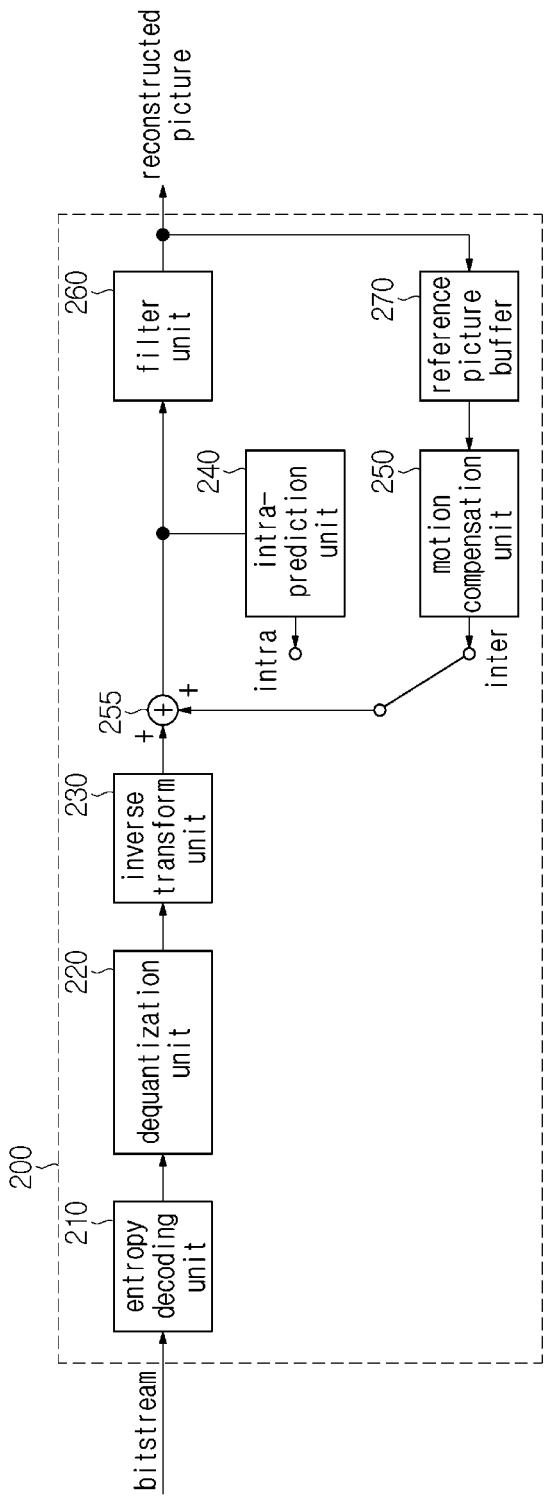
FIG. 2 is a block diagram showing configurations of a decoding apparatus according to an embodiment of the present invention.

The reconstructed block or the reconstructed image having passed through the filter unit 180 may be stored in the reference picture buffer 190. FIG. 2 is a block diagram showing a configuration of a decoding apparatus according to an embodiment and to which the present invention is applied.

A decoding apparatus 200 may a decoder, a video decoding apparatus, or an image decoding apparatus.

Referring to FIG. 2, the decoding apparatus 200 may include an entropy decoding unit 210, a dequantization unit 220, a inverse-transform unit 230, an intra-prediction unit 240, a motion compensation unit 250, an adder 225, a filter unit 260, and a reference picture buffer 270.

The decoding apparatus 200 may receive a bitstream output from the encoding apparatus 100. The decoding apparatus 200 may receive a bitstream stored in a computer readable recording medium, or may receive a bitstream that is streamed through a wired/wireless transmission medium. The decoding apparatus 200 may decode the bitstream by using an intra mode or an inter mode. In addition, the decoding apparatus 200 may generate a reconstructed image generated through decoding or a decoded image, and output the reconstructed image or decoded image.

When a prediction mode used when decoding is an intra mode, a switch may be switched to an intra. Alternatively, when a prediction mode used when decoding is an inter mode, a switch may be switched to an inter mode.

The decoding apparatus 200 may obtain a reconstructed residual block by decoding the input bitstream, and generate a prediction block. When the reconstructed residual block and the prediction block are obtained, the decoding apparatus 200 may generate a reconstructed block that becomes a decoding target by adding the reconstructed residual block with the prediction block. The decoding target block may be called a current block.

The entropy decoding unit 210 may generate symbols by entropy decoding the bitstream according to a probability distribution. The generated symbols may include a symbol of a quantized level form. Herein, an entropy decoding method may be a inverse-process of the entropy encoding method described above.

In order to decode a transform coefficient level, the entropy decoding unit 210 may change a one-directional vector form coefficient into a two-dimensional block form by using a transform coefficient scanning method.

A quantized level may be dequantized in the dequantization unit 220, or inverse-transformed in the inverse-transform unit 230. The quantized level may be a result of dequantizing or inverse-transforming or both, and may be generated as a reconstructed residual block. Herein, the dequantization unit 220 may apply a quantization matrix to the quantized level.

When an infra mode is used, the intra-prediction unit 240 may generate a prediction block by performing spatial prediction that uses a pixel value of a block adjacent to a decoding target block and which has been already decoded.

When an inter mode is used, the motion compensation unit 250 may generate a prediction block by performing motion compensation that uses a motion vector and a reference image stored in the reference picture buffer 270.

The adder 225 may generate a reconstructed block by adding the reconstructed residual block with the prediction block. The filter unit 260 may apply at least one of a deblocking filter, a sample adaptive offset, and an adaptive loop filter to the reconstructed block or reconstructed image. The filter unit 260 may output the reconstructed image. The reconstructed block or reconstructed image may be stored in the reference picture buffer 270 and used when performing inter-prediction.

Figure 3:
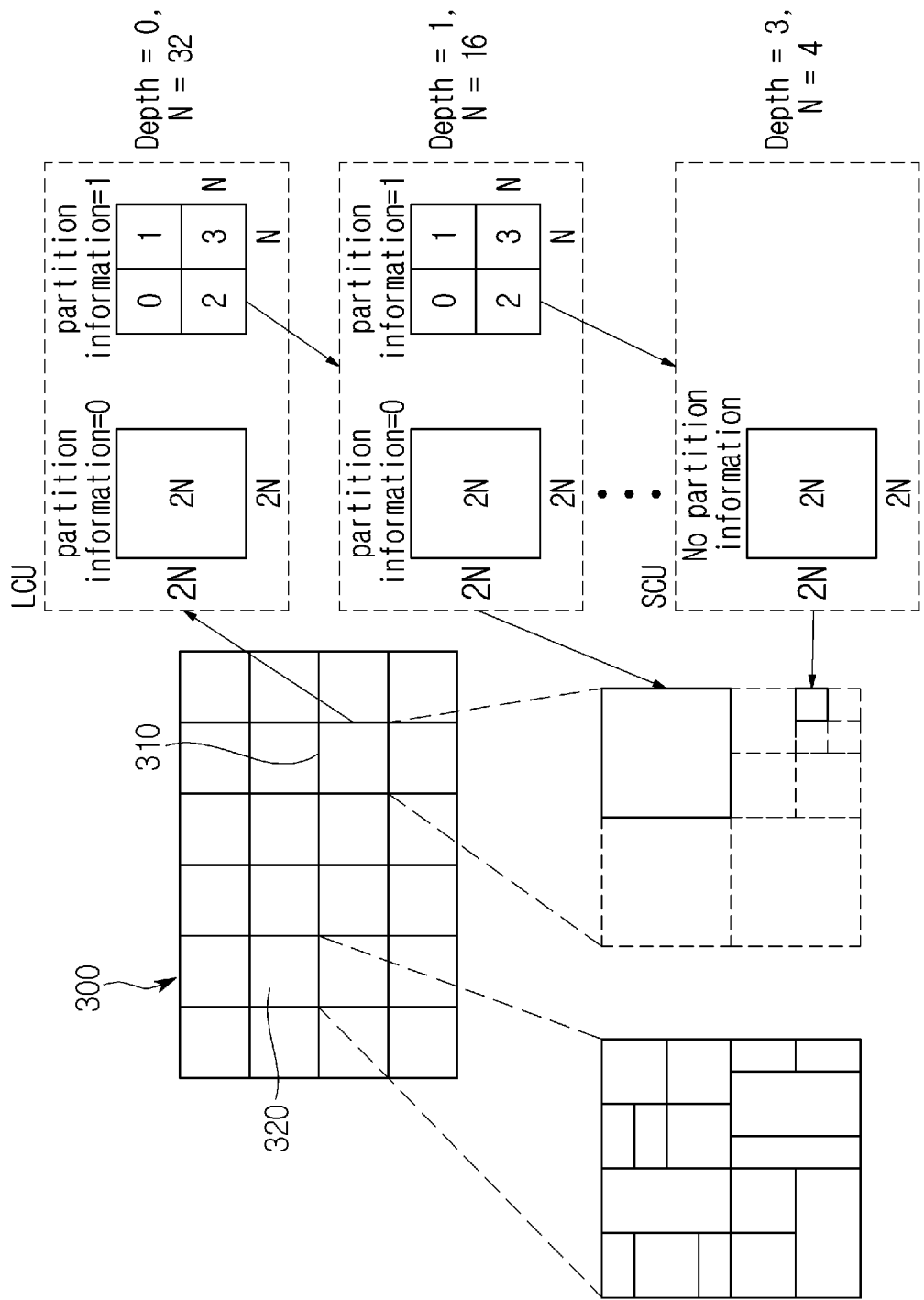
FIG. 3 is a view schematically showing a partition structure of an image when encoding and decoding the image.

FIG. 3 is a view schematically showing a partition structure of an image when encoding and decoding the image. FIG. 3 schematically shows an example of partitioning a single unit into a plurality of lower nits.

In order to efficiently partition an image, when encoding and decoding, a coding unit (CU) may be used. The coding unit may be used as a basic unit when encoding/decoding the image. In addition, the coding unit may be used as a unit for distinguishing an intra mode and an inter mode when encoding/decoding the image. The coding unit may be a basic unit used for prediction, transform, quantization, inverse-transform, dequantization, or an encoding/decoding process of a transform coefficient.

Referring to FIG. 3, an image 300 is sequentially partitioned in a largest coding unit (LCU), and a LCU unit is determined as a partition structure. Herein, the LCU may be used in the same meaning as a coding tree unit (CTU). A unit partitioning may mean partitioning a block associated with to the unit. In block partition information, information of a unit depth may be included. Depth information may represent a number of times or a degree or both in which a unit is partitioned. A single unit may be partitioned hi a layer associated with depth information based on a tree structure. Each of partitioned lower unit may have depth information, Depth information may be information representing a size of a CU, and may be stored in each CU.

A partition structure may mean a distribution of a coding unit (CU) within an LCU 310. Such a distribution may be determined according to whether or not to partition a single CU into a plurality (positive integer equal to or greater than 2 including 2, 4, 8, 16, etc.) of CUs. A horizontal size and a vertical size of the CU generated by partitioning may respectively be half of a horizontal size and a vertical size of the CU before partitioning, or may respectively have sizes smaller than a horizontal size and a vertical size before partitioning according to a number of times of partitioning. The CU may be recursively partitioned into a plurality of CUs. Partitioning of the CU may be recursively performed until to a predefined depth or predefined size. For example, a depth of an LCU may be 0, and a depth of a smallest coding unit (SCU) may be a predefined maximum depth. Herein, the LCU may be a coding unit having a maximum coding unit size, and the SCU may be a coding unit having a minimum coding unit size as described above. Partitioning is started from the LCU 310, a CU depth increases by 1 as a horizontal size or a vertical size or both of the CU decreases by partitioning.

In addition, information whether or not the CU is partitioned may be represented by using partition information of the CU. The partition information may be 1-bit information. All CUs, except for a SCU, may include partition information. For example, when a value of partition information is 1, the CU may not be partitioned, when a value of partition information is 2, the CU may be partitioned.

Referring to FIG. 3, an LCU having a depth 0 may be a 64×64 block. 0 may be a minimum depth. A SCU having a depth 3 may be an 8×8 block. 3 may be a maximum depth. A CU of a 32×32 block and a 16×16 block may be respectively represented as a depth 1 and a depth 2.

For example, when a single coding unit is partitioned into four coding units, a horizontal size and a vertical size of the four partitioned coding units may be a half size of a horizontal and vertical size of the CU before being partitioned. In one embodiment, when a coding unit having a 32×32 size is partitioned into four coding units, each of the four partitioned coding units may have a 16×16 size. When a single coding unit is partitioned into four coding units, it may be called that the coding unit may be partitioned into a guad-tree form.

For example, when a single coding unit is partitioned into two coding units, a horizontal or vertical size of the two coding units may be a half of a horizontal or vertical size of the coding unit before being partitioned. For example, when a coding unit having a 32×32 size is partitioned in a vertical direction, each of two partitioned coding units may have a size of 16×32. When a single coding unit is partitioned into two coding units, it may be called that the coding unit is partitioned in a binary-tree form. An LCU 320 of FIG. 3 is an example of an LCU to which both of partitioning of a quad-tree form and partitioning of a binary-tree form re applied.

Figure 4:
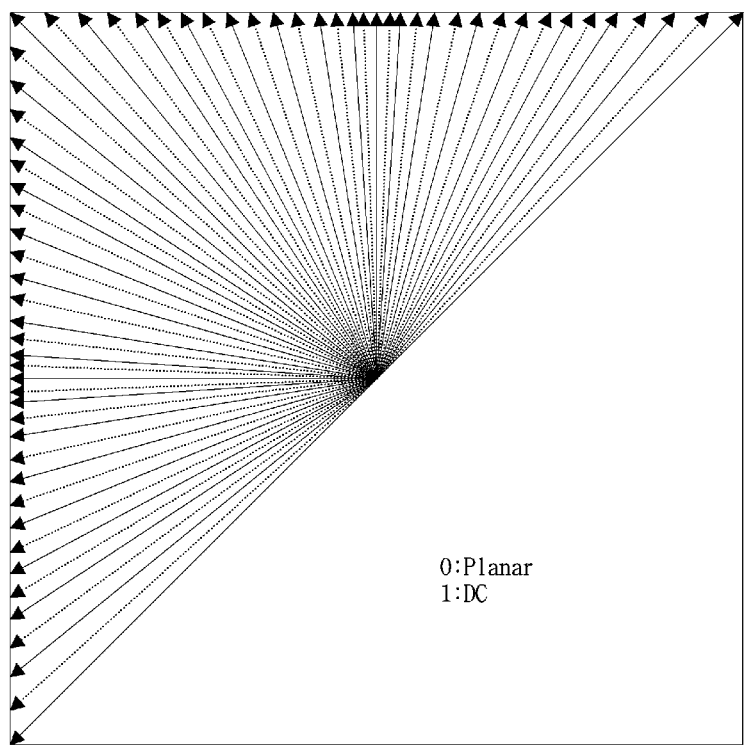
FIG. 4 is a view for explaining an embodiment of a process of intra prediction.

FIG. 4 is a view showing an intra-prediction process.

An intra-prediction mode may be a non-angular mode or an angular mode. The non-angular mode may be a DC mode or a planar mode, and the angular mode may be a prediction mode having a specific direction or angle. The intra-prediction mode may be expressed by at least one of a mode number, a mode value, a mode numeral, and a mode angle. A number of intra-prediction modes may be M including 1, and the non-angular and the angular mode.

A number of intra-prediction modes may be fixed to N regardless of a block size. Alternatively, a number of intra-prediction modes may vary according to a block size or a color component type or both. For example, as a block size becomes large, a number of intra-prediction modes may increase. Alternatively, a number of intra-prediction modes of a luma component block may be larger than a number of intra-prediction modes of a chroma component block.

In order to intra-predict a current block, a step of determining whether or not samples included in a reconstructed neighbor block may be used as reference samples of the current block may be performed. When a sample that is not usable as a reference sample of the current block is present, a value obtained by duplicating or performing interpolation on at least one sample value among samples included in the reconstructed neighbor block or both may be used to replace with a non-usable sample value of a sample, thus the replaced sample value is used as a reference sample of the current block.

When intra-predicting, a filter may be applied to at least one of a reference sample and a prediction sample based on an intra-prediction mode and a current block size.

In case of a planar mode, when generating a prediction block of a current block, according to a position of a prediction target sample within a prediction block, a sample value of the prediction target sample may be generated by using a weighted sum of an upper and left side reference sample of a current sample, and a right upper side and left lower side reference sample of the current block. In addition, in case of a DC mode, when generating a prediction block of a current block, an average value of upper side and left side reference samples of the current block may be used. In addition, in case of an angular mode, a prediction block may be generated by using an upper side, a left side, a right upper side, and/or a left lower side reference sample of the current block. In order to generate a prediction sample value, interpolation of a real number unit may be performed.

An intra-prediction mode of a current block may be entropy encoded/decoded by predicting an intra-prediction mode of a block present adjacent to the current block. When intra-prediction modes of the current block and the neighbor block are identical, information that the intra-prediction modes of the current block and the neighbor block are identical ay be signaled by using predetermined flag information. In addition, indicator information of an intra-prediction mode that is identical to the intra-prediction mode of the current block among intra-prediction modes of a plurality of neighbor blocks may be signaled. When intra-prediction modes of the current block and the neighbor block are different, intra-prediction mode information of the current block may be entropy encoded/decoded by performing entropy encoding/decoding based on the intra-prediction mode of the neighbor block.

Figure 5:
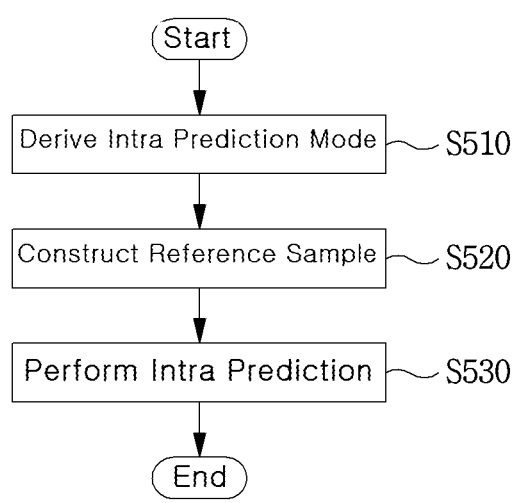
FIG. 5 is a view for illustrating intra-prediction according to the present invention.

FIG. 5 is a view for illustrating intra-prediction according to the present invention.

Intra-prediction for a current block may include at least one of step S510 of deriving an intra-prediction mode, step S520 of configuring a reference sample, and step S530 of performing intra-prediction.

In step S510, an intra-prediction mode of a current block may be derived. The intra-prediction mode of the current block may be derived by using at least one of a method using at least one of a slice type, a quantization parameter QP, a block size, and a block form, a method of determining a predetermined mode sameness, a method of configuring and classifying an MPM list, and a method of entropy encoding/decoding prediction mode information.

In step S520, the reference sample may be configured by performing at least one of reference sample selecting and reference sample filtering.

In step S530, intra-prediction for the current block may be performed by using at least one of non-angular prediction, angular prediction, and chroma intra prediction (LM: Linear Model). In addition, when performing intra-prediction, filtering for a prediction sample may be performed.

Over-head may be reduced by using an MPM mode and a non-MPM mode for signaling the intra-prediction mode. An indicator for distinguishing the above modes may be signaled (for example, prev_intra_luma_pred_flag).

The MPM list may be configured by including n MPM candidate modes. The n may be an integer equal to or greater than 1. The MPM candidate mode may be selected from an intra prediction mode of a neighbor block of the current block, a planar mode, and a DC mode, or an LM mode. When the MPM list includes a number of candidate modes which is smaller than n, a neighbor mode of an angular mode among modes that are added to the MPM list may be included in the MPM list. The neighbor mode may be a mode corresponding to an angular mode +m and an angular mode −m. The m may be an integer equal to or greater than 1. When the MPM list includes a number of candidate modes which is smaller than n afterwards, a default mode may be included in the MPM list. For example, the default mode may be a mode having a high occurrence frequency such as horizontal mode, vertical mode, a 45 degrees mode, a 135 degrees mode, etc.

When there is a big difference in an actual occurrence frequency of an MPM candidate mode, the MPM candidate mode is classified based on the actual occurrence frequency, thus the intra-prediction mode may be effectively signaled.

Table 1 is a table showing results and probabilities of selected intra-prediction modes that are encoded in two encoding configurations which are All Intra and Random Access in a BasketballDrill sequence.

TABLE 1

| QP | MPM 1 | MPM 2 | MPM 3 | MPM 4 | MPM 5 | MPM 6 | non MPM |
|---|---|---|---|---|---|---|---|
| BasketballDrill (All Intra)(%) | | | | | | | |
| 22 | 35.8 | 19.5 | 5.4 | 9.6 | 7.2 | 5.0 | 17.5 |
| 27 | 34.9 | 18.8 | 5.7 | 9.4 | 6.2 | 4.5 | 20.5 |
| 32 | 32.3 | 18.5 | 6.7 | 9.6 | 5.7 | 4.5 | 23.3 |
| 37 | 30.6 | 18.8 | 8.0 | 7.6 | 5.0 | 3.9 | 26.1 |
| BasketballDrill (Random Access)(%) | | | | | | | |
| 22 | 32.4 | 16.3 | 5.1 | 6.5 | 5.6 | 4.0 | 30.1 |
| 27 | 32.4 | 16.9 | 5.5 | 7.3 | 5.6 | 3.9 | 28.3 |
| 32 | 31.5 | 16.7 | 6.2 | 7.2 | 4.4 | 3.4 | 30.6 |
| 37 | 28.5 | 17.3 | 7.0 | 5.8 | 4.3 | 3.4 | 33.7 |

As Table 1 suggests, the intra-prediction mode of the current block is identical to a candidate mode 1 (MPM 1) of the MPM list with the highest probability. In other words, among candidate modes included in the MPM list, the MPM 1 has the highest occurrence frequency. Therefore, an indicator indicating that the MPM 1 is identical to the intra-prediction mode of the current block (for example, X mode flag) is signaled so that index information such as mode_Idx may not be additionally signaled. The mode_Idx may an index indicating a mode that is identical to the intra-prediction mode of the current block among modes included in the MPM list.

The MPM 1 may correspond to a predetermined mode of the present invention. For example, the predetermined mode may be a first candidate mode of the MPM list. However, it is not limited thereto, and it may be a fixed mode (for example, DC mode or planar mode), or a k-th candidate mode of the MPM list.

In case of a P or B slice, intra-prediction for a neighbor block of the current block may be rarely performed. Therefore, there is high probability that the MPM list may be configured to include a fixed mode. Alternatively, in case of an I slice, there is high probability in that the MPM list may be configured by using an intra-prediction mode of a neighbor block. In other words, according to the slice type, a method of configuring the MPM list may vary. Therefore, based on the slice type, a method of signaling the intra-prediction mode may be adaptively selected.

Referring again to Table 1, when a quantization parameter QP becomes smaller, the probability that the MPM 1 is identical to the intra-prediction mode of the current block becomes high. In other words, when the QP becomes smaller, the probability in that the MPM 1 is selected becomes high. Therefore, according to the QP, a method of signaling the intra-prediction mode may be adaptively selected.

Alternatively, both of the slice types to which the current block belongs and the QP of the current block may be considered.

Figure 6:
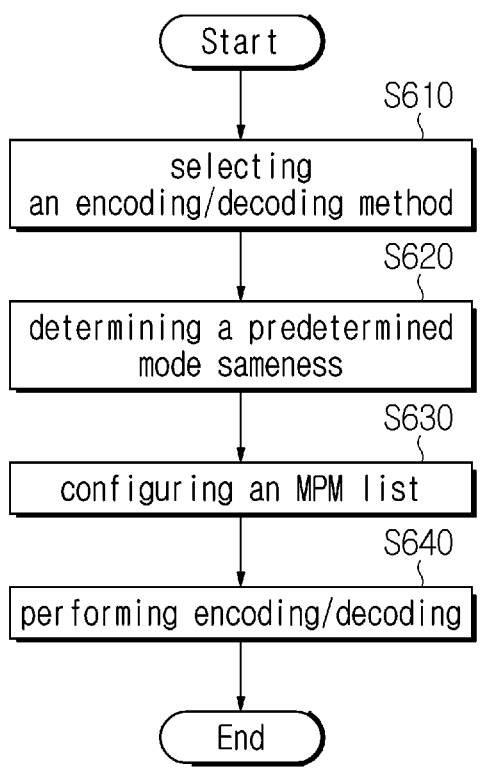
FIG. 6 is a view for illustrating step S510 of deriving an intra-prediction mode according to the present invention.

FIG. 6 is a view for illustrating step S510 of deriving an intra-prediction mode according to the present invention.

Deriving of the intra-prediction mode of the current block may include at least one of step S610 of selecting an encoding/decoding (signaling) method, step S620 of determining a predetermined mode sameness, step S630 of configuring an MPM list, and step S640 performing encoding/decoding of a prediction mode. The encoding/decoding may mean entropy encoding/decoding.

In step S610, an encoding/decoding method used for encoding/decoding the intra-prediction mode of the current block may be selected. Selecting of the encoding/decoding method may be performed based on at least one of a coding parameter of the current block, a slice type to which the current block belongs, a quantization parameter of the current block, a size of the current block, and a form of the current block. For example, by selecting the encoding/decoding method, at least one of step S620 of determining the predetermined mode sameness, step S630 of configuring the MPM list, and step S640 of encoding/decoding of the prediction mode may be differently performed.

In step S620, whether or not the intra-prediction mode of the current block is identical to the predetermined mode may be determined.

In step S630, based on the above sameness determination, the MPM list may be configured. The MPM list may be configured with k layers, and each layer may include a number of candidate modes, and the number may be identical or different.

In step S640, intra-prediction mode information for signaling the intra-prediction mode of the current block may be encoded/decoded. The intra-prediction mode information may include at least one of a predetermined mode sameness indicator, the intra-prediction mode of the current block, an indicator indicating whether or not the intra-prediction mode of the current block is included in the MPM list, and an index of the MPM list.

When a number of intra-prediction modes defined in an encoder/decoder is m, m intra-prediction modes may be grouped in a plurality of groups. Each group may include at least one intra-prediction mode. A number of intra-prediction modes included in each group may be identical, or may be different for at least one group. For a specific group of the plurality of groups, it may be limited to include a fixed number of intra-prediction modes that is pre-defined in the encoder/decoder. The fixed number may be, for example, n equal to or greater than 1.

Coding information (group indicating information) that specifies a group including the intra-prediction mode of the current block among the plurality of groups may be signaled. The group indicating information may be expressed as an index representing a specific group. Alternatively, the group indicating information may be expressed as a flag representing whether or not the intra-prediction mode of the current block is present in a corresponding group for each group. For example, when n groups are present, at least one to maximum n−1 flags may be signaled.

At least one of the n−1 flags may be selectively encoded/decoded based on at least one of a slice type, a quantization parameter QP, a block (CU, PU, or TU) size or form or both. For example, signaling of a flag or an index or both of a specific group may be skipped based on at least one of a slice type, a quantization parameter, a block size or form or both. For example, according to whether or not a slice type is a I slice, signaling of a first flag may be skipped. Alternatively, whether or not a quantization parameter is smaller than a first threshold value, signaling of a first flag may be skipped. Alternatively, according to at least one of whether or not a block size is equal to or greater than a predetermined size (N×M, N and M may be identical or different), whether or not a number of samples within the block is smaller than a second threshold value, and whether or not a block form is an asymmetric form, a square form, etc., signaling of a first flag may be skipped.

The above description is not limited to the first flag, and it may be identically or similarly applied to a second flag, a third flag, an n−1th flag, etc. The first threshold value or the second threshold value or both may be a fixed value that is pre-defined in the encoder/decoder, or may be variably derived based on a slice type, a block size/form, a bit depth, a quantization parameter, etc.

When a plurality of intra-prediction modes are included within a group, a flag or index representing a position of the intra-prediction mode of the current block may be additionally signaled. When a single intra-prediction mode is included within the group, the flag or index may not be signaled.

In addition, the flag may be selectively encoded/decoded according to a dependency between groups. For example, when the intra-prediction mode of the current block is not present in a first group (first flag=0), a flag (second flag) representing whether or not the intra-prediction mode is present in a second group may be signaled. Similarly, when the second flag is 0, a flag (third flag) representing whether or not the intra-prediction mode of the current block is present in a third group may be signaled.

In order to signal the intra-prediction mode of the current block, whether or not the intra-prediction mode is identical to a predetermined mode is determined. The MPM list is configured based on this, and intra-prediction mode information may be encoded/decoded.

An indicator indicating whether or not the intra-prediction mode of the current block is identical to the predetermined mode (predetermined mode sameness indicator) may be encoded/decoded. The predetermined mode may be at least one of an intra-prediction mode of at least one neighbor block of the current block, a DC mode and a planar mode. Alternatively, the predetermined mode may be a mode included in any one of the above groups (for example, first group).

Figure 7:
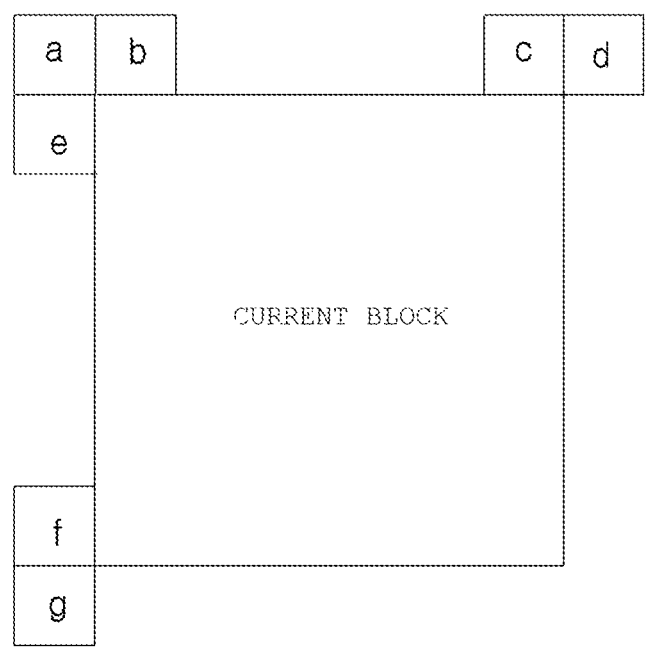
FIG. 7 is a view for illustrating at least one neighbor block of the current block.

FIG. 7 is a view for illustrating at least one neighbor block of the current block.

An intra-prediction mode of a neighbor block at a specific position among neighbor blocks of the current block may be the predetermined mode. For example, the predetermined mode may be 'f'. Herein, when a mode corresponding to T is not present, one of an intra-prediction mode, a DC mode, and a planar mode of another neighbor block at another position may be the predetermined mode. For example, the intra-prediction mode of the neighbor block at another position may be 'c'. When both of 'f' and 'c' are not present, a DC mode or a planar mode may be the predetermined mode.

When the intra-prediction mode of the current block is identical to the predetermined mode, the encoder may encode a predetermined mode sameness indicator having a value 1 (first value). The decoder may derive the intra-prediction mode of the current block as the predetermined mode when the decoder receives a predetermined mode sameness indicator having a value 1.

When the intra-prediction mode of the current block is not identical to the predetermined mode, the encoder may encode a predetermined mode sameness indicator having a value 2 (second value). In continuation, the encoder may encode an MPM matching indicator. The MPM matching indicator may be an indicator representing whether or not a mode identical to the intra-prediction mode of the current block is present within an MPM list. The decoder may decode an MPM matching indicator when the decoder receives a predetermined mode sameness indicator having a value 0.

The MPM list may be configured by using an intra-prediction mode of at least one neighbor block. The MPM list may include n candidate modes according to a predetermined order. Referring to FIG. 7, for example, the MPM list may be configured by including candidate modes in an order of 'c', planar, DC, 'g', 'd', and 'a'. Herein, when the candidate mode is identical to the predetermined mode or is identical to a mode that is already included in the MPM list, the candidate mode may not be added to the MPM list. When a number of candidate modes includes in the MPM list is smaller than n, at least one of an angular mode +1, an angular mode−1, the angular mode being included in the MPM list, a horizontal mode, a vertical mode, a 45 degrees mode, a 135 degrees mode, and a 225 degrees mode may be added to the MPM list.

When the intra-prediction mode of the current block is included in the MPM list, the encoder may encode an MPM matching indicator having a value 1 (first value) and an MFM index for the MPM list. The MPM index may be an index indicating a mode identical to the intra-prediction mode of the current block among candidate modes included in the MPM list. The decoder may decode an MPM index when the decoder receives an MPM matching indicator having a value 1, and derive the intra-prediction mode of the current block by using the MPM list and the MPM index.

When the intra-prediction mode of the current block is not included in the MPM list, the encoder may encode an MPM matching indicator having a value 0 (second value) and information indicating the intra-prediction mode of the current block. The information indicating the intra-prediction mode of the current block (intra-prediction mode indicating information) may be information indicating a mode corresponding to the predetermined mode and the intra-prediction mode of the current block among modes except for the predetermined mode and candidate modes included in the MPM list. The decoder may derive the intra-prediction mode of the current block by decoding intra-prediction mode indicating information when the decoder receives an MPM matching indicator having a value 0.

Table 2 is a table showing bins of the MPM index according to at least one of the predetermined mode sameness indicator (for example, X mode flag), the MPM matching indicator (for example, MPM flag), and the MPM index (for example, MPM Idx) value.

TABLE 2

| predetermined mode sameness indicator (X mode flag) | MPM matching indicator (MPM flag) | MPM Idx | MPM Idx bins | bins |
| --- | --- | --- | --- | --- |
| 1 | — | — | | 1 |
| 0 | 1 | 0 | 0 | 3 |
| | | 1 | 1 0 | 4 |
| | | 2 | 1 1 0 | 5 |
| | | 3 | 1 1 1 0 | 6 |
| | | 4 | 1 1 1 1 | 6 |

In Table 2, when the predetermined mode sameness indicator has a value 1, signaling for additionally indicating the mode is not required. In other words, when the predetermined mode sameness indicator is 1, the intra-prediction mode of the current block may be derived as the predetermined mode.

As described above, in order to signal the intra-prediction mode of the current block, M MPM lists may be configured. Herein, each MPM list may include N candidate modes. Herein, M or N may be an integer equal to or greater than 1.

For example, a single MPM list including six candidate modes may be configured. For example, referring to FIG. 7, according to an order of 'f', 'c', planar, DC, 'g', 'd', and 'a', the MPM list may be configured. When the candidate mode is overlapped or the candidate mode is not present so that the MPM list is not set, the MPM list may be configured by adding at least one of an angular mode +1, an angular mode −1, the angular mode being included in the MPM list, a horizontal mode, a vertical mode, a 45 degrees mode, a 135 degrees mode, and a 225 degrees mode.

For example, two MPM lists may be configured. The first MPM list may include a single candidate mode. The second MPM list may include five candidate modes. For example, referring to FIG. 7, according to an order of f, 'c', planar, DC, 'g', 'd', and 'a', the first MPM list may be configured first. After, the second MPM list may be configured. A process performed when the MPM list is not set with the candidate mode is as described above.

For example, two MPM lists may be configured. The first MPM list may include three candidate modes. The second MPM list may include three candidate modes. For example, referring to FIG. 7, according to an order of 'f', 'c', planar, DC, 'g', 'd', and 'a', the first MPM list may be configured first, and the second MPM list may be configured afterwards. Alternatively, according to the above order the candidate modes may be included in the first MPM list and the second MPM list in turn. A process performed when the MPM list is not set with the candidate mode is as described above.

For example, two MPM lists may be configured. The first MPM list may include two candidate modes. The second MPM list may include four candidate modes. For example, referring to FIG. 7, according to an order of planar, DC, 'f', 'c', 'g', 'd', and 'a', the first MPM list may be configured first, and the second MPM list may be configured afterwards. Alternatively, according to the above order, the candidate modes may be included the first MPM list and the second MPM list in turn. A process performed when the MPM list is not set to the candidate mode is as described above.

Figure 8:
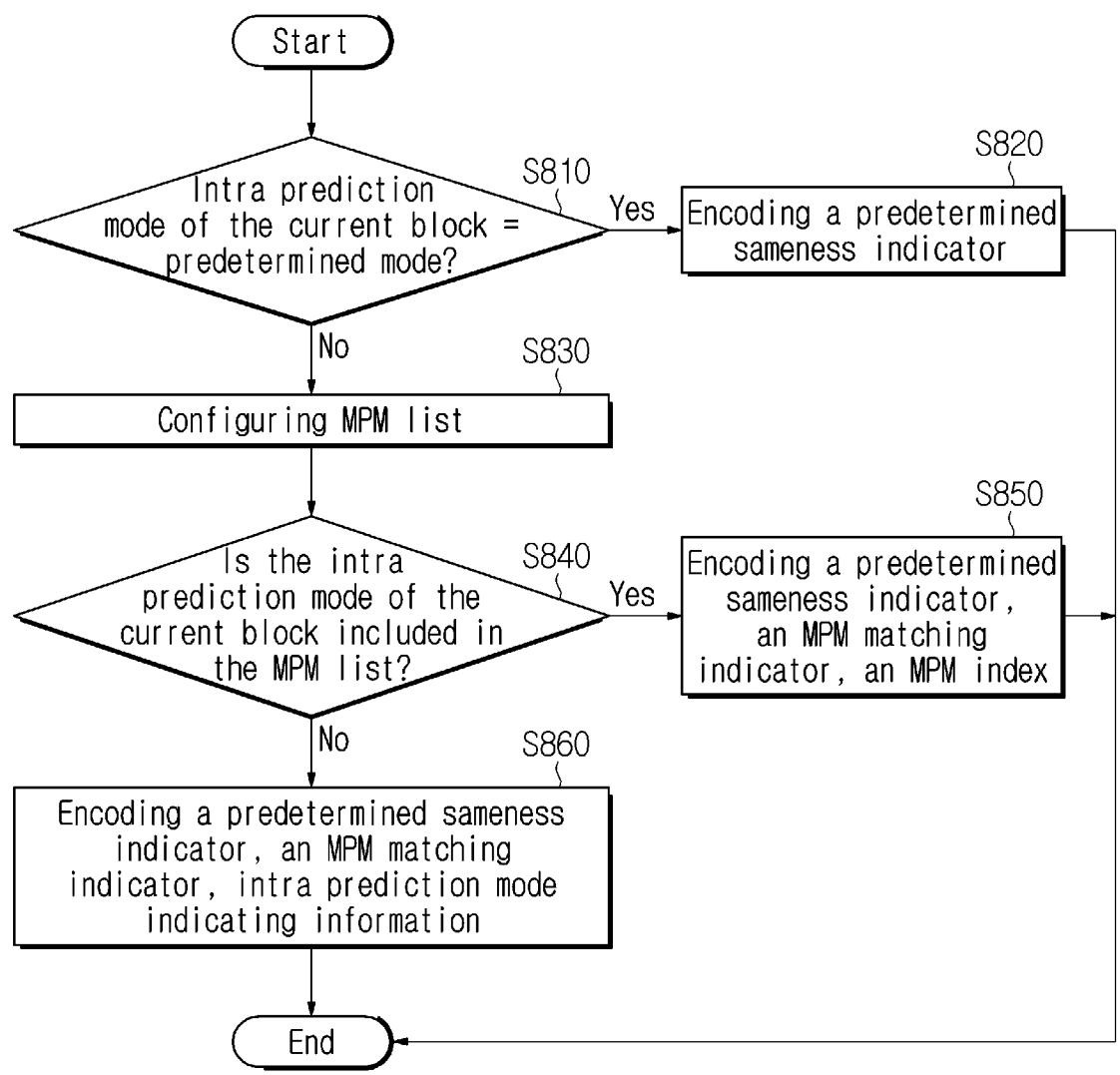
FIG. 8 is a view for illustrating encoding of an intra-prediction mode of a current block.

FIG. 8 is a view for illustrating encoding of an intra-prediction mode of a current block.

The intra-prediction mode information may be at least one of intra-prediction mode indicating information of the current block, a predetermined mode sameness indicator, an MPM matching indicator, and an MPM index.

In step S810, whether or not an intra-prediction mode of the current block is identical to a predetermined mode may be determined. When the intra-prediction mode of the current block is identical to the predetermined mode, in step S820, a predetermined mode sameness indicator having a first value (for example, 1) may be encoded. Otherwise, in step S830, at least one MPM list may be configured.

In step S840, whether or not the intra-prediction mode of the current block is included in the MPM list may be determined. When the intra-prediction mode of the current block is included in the MPM list, in step S850, a predetermined mode sameness indicator having a second value (for example, 0), an MPM matching indicator having a first value, and an MPM index may be encoded. Otherwise, in step S860, a predetermined mode sameness indicator having a second value, an MPM matching indicator having a second value, and intra-prediction mode indicating information of the current block may be encoded.

Figure 9:
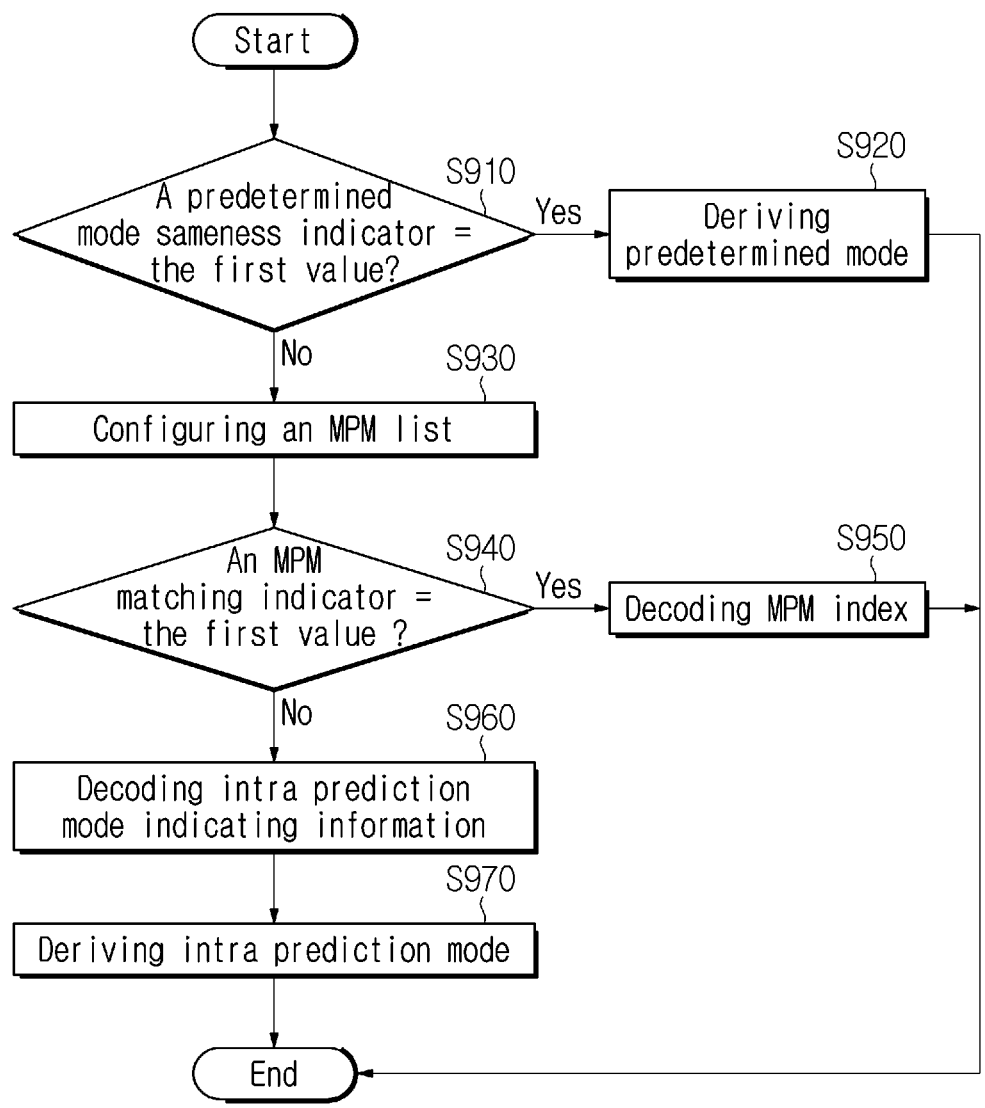
FIG. 9 is a view for illustrating decoding of an intra-prediction mode of a current block

FIG. 9 is a view for illustrating decoding of an infra-prediction mode of a current block In step S910, a predetermined mode sameness indicator may be decoded. When the predetermined mode sameness indicator has a first value, in step S920, a predetermined mode may be derived. In step S970, an intra-prediction mode of a current block may be derived based on this. When the predetermined mode sameness indicator has a second value, in step S930, an MPM list may be configured.

In step S940, an MPM matching indicator may be decoded. When the MPM matching indicator has a first value, in step S950, an MPM index may be decoded, and in step S970, the intra-prediction mode of the current block may be derived based on this. When the MPM matching indicator has a second value, in step S960, intra-prediction mode indicating information of the current block may be decoded, and in step S970, the intra-prediction mode of the current block may be derived.

When the MPM list includes a single candidate mode and the MPM matching indicator has a first value, the MPM index may not be encoded/decoded. Herein, the intra-prediction mode of the current block may be derived as the candidate mode.

In the embodiment described with reference to FIG. 8 and FIG. 9, a plurality of MPM lists may be present. For example, two MPM lists may respectively include a single MPM candidate mode and five MPM candidate modes. As described above, an MPM index for the MPM list including a single candidate mode may not be encoded/decoded. When a plurality of MPM lists is present, according to a predetermined order, an MPM matching indicator may be sequentially encoded/decoded. An MPM matching indicator for an n-th MPM list may be encoded/decoded when an MPM matching indicator for an n–1th MPM list has a second value. An MPM index for a corresponding MPM list may be encoded/decoded when an MPM matching indicator for a corresponding MPM list has a first value. The intra-prediction mode indicating information of the current block may be encoded/decoded when all MPM matching indicators for MPM lists have a second value.

In order to encode/decode the intra-prediction mode information, at least one binarization method may be used. The binarization method may include at least one of a truncated rice binarization method, a k-th order Exp_Golomb binarization method, a constrained k-th order Exp_Golomb binarization method, a fixed-length binarization method, a unary binarization method, and a truncated unary binarization method.

Table 3 shows bins of MPM indexes when a single MPM list including six candidate modes is used, and a truncated unary binarization method is used for processing binarization.

TABLE 3

| MPM flag | MPM Idx | MPM Idx bins | | | | | bins |
|---|---|---|---|---|---|---|---|
| 1 | 0 | 0 | | | | | 2 |
|   | 1 | 1 | 0 | | | | 3 |
|   | 2 | 1 | 1 | 0 | | | 4 |
|   | 3 | 1 | 1 | 1 | 0 | | 5 |
|   | 4 | 1 | 1 | 1 | 1 | 0 | 6 |
|   | 5 | 1 | 1 | 1 | 1 | 1 | 6 |

Table 4 shows bins of MPM indexes when a first MPM list including a single candidate mode and a second MPM list including five candidate modes are used, and a truncated unary binarization method is used for processing binarization.

TABLE 4

| 1st MPM flag | 2nd MPM flag | MPM Idx | MPM Idx bins | | | | bins |
|---|---|---|---|---|---|---|---|
| 1 | — | — | | | | | 1 |
| 0 | 1 | 0 | 0 | | | | 3 |
|   |   | 1 | 1 | 0 | | | 4 |
|   |   | 2 | 1 | 1 | 0 | | 5 |
|   |   | 3 | 1 | 1 | 1 | 0 | 6 |
|   |   | 4 | 1 | 1 | 1 | 1 | 6 |

The total number of bits for expressing six candidate modes of Table 3 is 26 bits, and the total number of bits for expressing six candidate modes of Table 4 is 25 bits. This is because, a single predetermined mode of Table 4 may be expressed by using one bit. When a predetermined mode is selected as an intra-prediction mode, in the binarization method of Table 4, a number of bits equal to a number of selected predetermined modes may be reduced more than the binarization method of Table 3.

As described above, selecting of an encoding/decoding method used for encoding/decoding an intra-prediction mode of a current block may be performed based on at least one of a coding parameter of the current block, a slice type of a slice to which the current block belongs, a quantization parameter of the current block, a size of the current block, and a form of the current block.

In detail, at least one of performing whether or not to determine a predetermined mode sameness, a number of MPM lists, and a number of MPM candidate modes to be included in each MPM list may be determined according to a slice type to which the current block belong. For example, when a slice to which the current block belongs is at least one of a I slice, a P slice, and a B slice, determining of the predetermined mode sameness may be performed, a single MPM list may be configured, or two MPM lists may be configured.

Alternatively, based on a result obtained by comparing a QP of the current block with a threshold value, for example, when the QP of the current block is smaller than the threshold value, determining of the predetermined mode sameness may be performed, a single MPM list may be configured, or two MPM lists may be configured. Alternatively, when the QP of the current block is greater than the threshold value, the above process may be performed.

Alternatively, when the current block has a predetermined size (4×4, 8×8, 16×16, 32×32, 32×16, etc.), determining of the predetermined mode sameness may be performed, a single MPM list may be configured, or two MPM lists may be configured.

Alternatively, when the current block has a specific form (square, 1:2 rectangle, 2:1 rectangle, 4:1 rectangle, 1:4 rectangle, etc.), determining of the predetermined mode sameness may be performed, a single MPM list may be configured, or two MPM lists may be configured.

Alternatively, when at least two of the above conditions are satisfied, the above process may be performed. For example, when a slice type is a I slice and a QP value of the current block is smaller than a threshold value, an encoding/decoding method may vary. For example, when a slice type is a I slice and the current block is a square block having an 8×8 size, an encoding/decoding method may vary.

In addition to selecting of the encoding/decoding method described above, a predetermined mode according to the present invention may be adaptively derived according to a coding parameter of a current block, a slice type, and a block size or form or both. In addition, a deriving order and a deriving method of an MPM candidate mode according to the present invention may be adaptively determined according to a coding parameter, a slice type, and a block size and/or a form of the current block.

Information representing whether or not an intra-prediction mode signaling method according to the present invention (for example, indicator such as flag, etc.) is applicable may be signaled in a higher level of a block. The higher level may be, for example, at least one of a video, a sequence, a picture, a slice, a tile, a CTU, and a CU. For example, when it is determined that an intra-prediction mode signaling method according to the present invention is effective after encoding a specific slice (or, sequence or picture), information indicating whether or not the intra-prediction mode signaling method according to the present invention is applicable may be included in a slice header (or, sequence parameter set (SPS) or picture parameter set (PPS)). When the intra-prediction mode signaling method according to the present invention is applied, information of a predetermined mode may be signaled. The information of the predetermined mode may be information for deriving the predetermined mode. For example, the information of the predetermined mode may indicate a first mode, an n-th mode, a DC mode, or a planar mode included in an MPM list. When information for deriving the predetermined mode is not signaled, the predetermined mode may be derived by using a default method. For example, the default method may be a method of deriving a first candidate mode of an MPM list as the predetermined mode.

Information representing whether or not an intra-prediction mode signaling method according to the present invention is applicable and information of a predetermined mode may be signaled in levels different from each other. For example, when the intra-prediction mode signaling method according to the present invention is applicable in a picture level, the information of the predetermined mode may be differently transmitted from a slice level. Herein, a method of deriving a predetermined mode of each slice included in a corresponding picture may vary.

Based on the derived intra-prediction mode, a reference sample for intra-prediction may be configured. In the following description, a current block may mean a prediction block or a sub-block having a size/form smaller than a size/form of the prediction block. The reference sample may be configured by using at least one sample that is reconstructed adjacent to the current block or by using a combination thereof. In addition, filtering may be applied when configuring the reference sample.

A number of reconstructed sample lines or positions thereof or both which is used for configuring the reference sample may vary according to a position of a current block within a coding tree block. Each reconstructed sample of a plurality of reconstructed sample lines may be used as the reference sample as it is. Alternatively, a predetermined filter may be applied to the reconstructed sample, and the reference sample may be generated by using the filtered reconstructed sample. The reconstructed samples to which the filter is applied may belong to an identical reconstructed sample line or to another reconstructed sample line.

The configured reference sample may be represented as ref[m, n], and a neighbor reconstructed sample or a sample obtained by applying filtering thereof may be represented as rec[m, n]. Herein, m or n may be a predetermined integer representing a position of a sample. When a position of a left upper side sample within the current block is (0, 0), a position of a left upper side reference sample of the current block may be set to (−1, −1).

In order to configure the reference sample, it may be determined whether or not a neighbor reconstructed sample is available. When the neighbor reconstructed sample is positioned outside of at least one of a picture, a slice, a tile, and a CTU, the neighbor reconstructed sample may be determined as unavailable. Alternatively, when constrained intra-prediction is performed for a current block, and the neighbor reconstructed sample is positioned in a block that is inter encoded/decoded, the neighbor reconstructed sample may be determined as unavailable.

When the neighbor reconstructed sample is determined as unavailable, an unavailable sample may be replaced by using an available neighbor reconstructed sample. For example, the unavailable sample may be set by using available samples starting from a left lower side positioned sample. Alternatively, the unavailable sample may be replaced by using a combination of available samples. For example, the unavailable sample may be replaced with an average value of available samples positioned at both ends of the unavailable sample.

Alternatively, the unavailable samples may be replaced by using information of available samples. Herein, the unavailable samples may be replaced with an arbitrary value rather than an available neighbor sample value. The arbitrary value may be an average value of available sample values, or may be a value in consideration of gradients of available sample values. Alternatively, both of the average value and the gradient may be used. The gradient may be determined based on a residual value of available neighbor samples. Alternatively, it may be determined based on the average value and a residual value of available sample values. In addition to the average value, a maximum value, a minimum value, a median value, or a weighted sun using an arbitrary weight may be used. The arbitrary weight may be determined based on a distance between an available sample and an unavailable sample.

The above methods may be applied to all upper and left side reference samples or may be applied only to an arbitrary angle. In addition, the above methods may be applied when a reference sample line of the current block is configured by using a plurality of reconstructed sample lines.

Whether to apply filtering to at least one configured reference sample may be determined based on at least one of an intra-prediction mode of the current block, and a block size/form. When filtering is applied, a filter type may vary according to the intra-prediction mode, the size, and the form of the current block.

Intra-prediction for the current block may be performed based on the derived intra-prediction mode and the reference sample.

In case of a DC mode, an average value of at least one of the configured reference samples may be used. Herein, filtering may be applied to at least one prediction sample positioned at a boundary of the current block. DC prediction may be differently performed based on at least one of a size and a form of the current block. For example, based on a size or form or both of the current block, a range of a reference sample used in a DC mode may be specified.

In case of a planar mode, according to a position of an intra-prediction target sample of the current block, a weighted sum in consideration of a distance from at least one reference sample may be used.

In case of an angular mode, at least one reference sample present on a predetermined angle line at a position of an intra-prediction target sample and present adjacent to the intra-prediction target sample may be used.

When performing intra-prediction between color components, for example, intra-prediction for a chroma component may be performed by suing a reconstructed luma component of a current block. Alternatively, intra-prediction for another chroma component (for example, Cr) may be performed by using a single reconstructed chroma component (for example, Cb) of the current block.

The above embodiments may be performed in the same method in an encoder and a decoder.

A sequence of applying to above embodiment may be different between an encoder and a decoder, or the sequence applying to above embodiment may be the same in the encoder and the decoder.

The above embodiment may be performed on each luma signal and chroma signal, or the above embodiment may be identically performed on luma and chroma signals.

A block form to which the above embodiments of the present invention are applied may have a square form or a non-square form.

The above embodiment of the present invention may be applied depending on a size of at least one of a coding block, a prediction block, a transform block, a block, a current block, a coding unit, a prediction unit, a transform unit, a unit, and a current unit. Herein, the size may be defined as a minimum size or maximum size or both so that the above embodiments are applied, or may be defined as a fixed size to which the above embodiment is applied. In addition, in the above embodiments, a first embodiment may be applied to a first size, and a second embodiment may be applied to a second size. In other words, the above embodiments may be applied in combination depending on a size. In addition, the above embodiments may be applied when a size is equal to or greater that a minimum size and equal to or smaller than a maximum size. In other words, the above embodiments may be applied when a block size is included within a certain range.

For example, the above embodiments may be applied when a size of current block is 8×8 or greater. For example, the above embodiments may be applied when a size of current block is 4×4 or greater. For example, the above embodiments may be applied when a size of current block is 16×16 or greater. For example, the above embodiments may be applied when a size of current block is equal to or greater than 16×16 and equal to or smaller than 64×64.

The above embodiments of the present invention may be applied depending on a temporal layer. In order to identify a temporal layer to which the above embodiments may be applied may be signaled, and the above embodiments may be applied to a specified temporal layer identified by the corresponding identifier. Herein, the identifier may be defined as the lowest layer or the highest layer or both to which the above embodiment may be applied, or may be defined to indicate a specific layer to which the embodiment is applied. In addition, a fixed temporal layer to which the embodiment is applied may be defined.

For example, the above embodiments may be applied when a temporal layer of a current image is the lowest layer. For example, the above embodiments may be applied when a temporal layer identifier of a current image is 1. For example, the above embodiments may be applied when a temporal layer of a current image is the highest layer.

A slice type to which the above embodiments of the present invention are applied may be defined, and the above embodiments may be applied depending on the corresponding slice type.

In the above-described embodiments, the methods are described based on the flowcharts with a series of steps or units, but the present invention is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present invention.

The embodiments include various aspects of examples. All possible combinations for various aspects may not be described, but those skilled in the art will be able to recognize different combinations. Accordingly, the present invention may include all replacements, modifications, and changes within the scope of the claims.

The embodiments of the present invention may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and constructed for the present invention, or well-known to a person of ordinary skilled in computer software technology field. Examples of the computer-readable recording medium include magnetic recording media such as hard disks, floppy disks, and magnetic tapes; optical data storage media such as CD-ROMs or DVD-ROMs; magneto-optimum media such as floptical disks; and hardware devices, such as read-only memory (ROM), random-access memory (RAM), flash memory, etc., which are particularly structured to store and implement the program instruction. Examples of the program instructions include not only a mechanical language code formatted by a compiler but also a high level language code that may be implemented by a computer using an interpreter. The hardware devices may be configured to be operated by one or more software modules or vice versa to conduct the processes according to the present invention.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

Industrial Applicability

The present invention may be used in encoding/decoding an image.

The invention claimed is:

1. An image decoding method comprising:
   decoding a predetermined mode sameness indicator indicating whether or not an intra prediction mode of a current block is a predetermined mode;
   in case the predetermined mode sameness indicator indicating that the intra prediction mode of the current block is the predetermined mode, determining the intra prediction mode of the current block to be the predetermined mode;
   in case the predetermined mode sameness indicator indicating that the intra prediction mode of the current block is not the predetermined mode, determining the intra prediction mode of the current block from among a plurality of intra prediction modes that do not contain the predetermined mode;
   deriving a reference sample of intra prediction of the current block;
   generating a prediction block of the current block by performing intra prediction of the current block based on the intra prediction mode and the reference sample;
   generating a residual block of the current block based on residual data of the current block; and
   reconstructing the current block based on the prediction block and the residual block.

2. The method of claim 1, wherein the predetermined mode is a planar mode.

3. The method of claim 1, wherein, in case the predetermined mode sameness indicator indicating that the intra prediction mode of the current block is not the predetermined mode, the intra prediction mode of the current block is derived based on an MPM list for the current block and an index indicating one mode inside the MPM list.

4. The method of claim 3, wherein the MPM list does not include the predetermined mode.

5. An image encoding method comprising:
   determining an intra prediction mode of a current block;
   encoding a predetermined mode sameness indicator indicating whether or not the intra prediction mode of the current block is a predetermined mode based on the intra prediction mode of the current block
   deriving a reference sample of intra prediction of the current block;
   generating a prediction block of the current block by performing intra prediction of the current block based on the intra prediction mode and the reference sample;
   generating a residual block of the current block based on the prediction block of the current block; and
   generating the residual data of the current block by encoding the residual block,
   wherein in case the intra prediction mode of the current block is the predetermined mode, the predetermined mode sameness indicator is configured to indicate that the intra prediction mode of the current block is the predetermined mode, and
   in case the intra prediction mode of the current block is not the predetermined mode, the predetermined mode sameness indicator is configured to indicate that the intra prediction mode of the current block is determined from among a plurality of intra prediction modes that do not contain the predetermined mode.

6. The method of claim 5, wherein the predetermined mode is a planar mode.

7. The method of claim 5, wherein, in case the intra prediction mode of the current block is not the predetermined mode, the predetermined mode sameness indicator is configured to indicate that the intra prediction mode of the current block is encoded using an MPM list for the current block and an index indicating one mode inside the MPM list.

8. The method of claim 7, wherein the MPM list does not include the predetermined mode.

9. A non-transitory computer readable recording medium storing a bitstream which is received, decoded and used to reconstruct an image by an image decoding apparatus,
   wherein the bitstream comprises a predetermined mode sameness indicator of a current block indicating whether or not an intra prediction mode of the current block is a predetermined mode and residual data of the current block,
   in case the predetermined mode sameness indicator indicating that the intra prediction mode of the current block is the predetermined mode, the intra prediction mode of the current block is determined to be the predetermined mode,
   in case the predetermined mode sameness indicator indicating that the intra prediction mode of the current block is not the predetermined mode, the intra prediction mode of the current block is determined from among a plurality of intra prediction modes that do not contain the predetermined mode,
   the intra prediction mode is used with a reference sample of the intra prediction to generate a prediction block of the current block by performing intra prediction of the current block,
   a residual block of the current block is generated based on the residual data of the current block, and the prediction block is used with a residual block to reconstruct the current block.

* * * * *